United States Patent [19]

Funada et al.

[11] 4,436,379

[45] Mar. 13, 1984

[54] TWO-LAYER LIQUID CRYSTAL DISPLAY PANEL

[75] Inventors: Fumiaki Funada, Yamatokoriyama; Syuichi Kozaki, Nara; Masataka Matsuura, Tenri; Tomio Wada, Nara, all of Japan

[73] Assignee: Sharp Kabushiki Kaisha, Osaka, Japan

[21] Appl. No.: 206,532

[22] Filed: Nov. 13, 1980

[30] Foreign Application Priority Data

Nov. 13, 1979 [JP] Japan ................. 54-147244

[51] Int. Cl.³ .......................................... G02F 1/13
[52] U.S. Cl. ............................ 350/347 E; 350/335; 350/350 R
[58] Field of Search ............... 350/334, 335, 350 R, 350/347 R, 347 E

[56] References Cited

U.S. PATENT DOCUMENTS

| | | | |
|---|---|---|---|
| 3,694,053 | 9/1972 | Kahn | 350/347 E |
| 3,912,369 | 10/1975 | Kashnow | 350/347 R |
| 3,915,554 | 10/1975 | Maezawa | 350/347 E |
| 4,019,808 | 4/1977 | Scheffer | 350/347 R |
| 4,097,128 | 6/1978 | Matsumoto et al. | 350/347 E X |
| 4,231,640 | 11/1980 | Funada et al. | 350/335 X |
| 4,232,948 | 11/1980 | Shanks | 350/347 R |
| 4,239,349 | 12/1980 | Scheffer | 350/347 R |
| 4,343,535 | 8/1982 | Bleha, Jr. | 350/347 R |
| 4,385,806 | 5/1983 | Fergason | 350/347 R |

FOREIGN PATENT DOCUMENTS 1390925  4/1975  United Kingdom ............ 350/347 R

OTHER PUBLICATIONS

Scheffer, Terry J., "New Multicolor Liquid Crystal Displays That Use A Twisted Nematic Electro-Optic Cell," *J. Applied Physics*, vol. 44, No. 11 (Nov. 1973) pp. 4799-4803.

Shanks, I. A., "Electro-Optical Colour Effects by Twisted Nematic Liquid Crystal," *Electronics Letters*, vol. 10, No. 7 (Apr. 14, 1974) pp. 90-91.

Armitage, D., "Improvement of Color Uniformity in Tunable Birefringent Display," *IBM Disclosure Bull.*, vol. 23, No. 2 (Jul. 1980) p. 790.

Shimomura, T. et al., "Voltage Controllable Color Formation with a Twisted Nematic Liquid Crystal Cell," *Japanese J. Applied Physics*, vol. 14, No. 7 (1975) pp. 1093-1094.

*Primary Examiner*—Bruce Y. Arnold
*Assistant Examiner*—Richard F. Gallivan
*Attorney, Agent, or Firm*—Birch, Stewart, Kolasch & Birch

[57] ABSTRACT

A twisted nematic liquid crystal display cell has two layers each containing a liquid crystal material. It is selected that the respective values of $\Delta n \cdot d$, where $\Delta n$ is the double refractive index of a liquid crystal layer and d is the thickness of a liquid crystal layer, deviate from each other, in connection with the two liquid crystal layers by about 5% to about 30%, more preferably, about 10% to about 20%. This leads to the advantage that coloration of transmission light owing to interference by double refraction is prevented.

3 Claims, 1 Drawing Figure

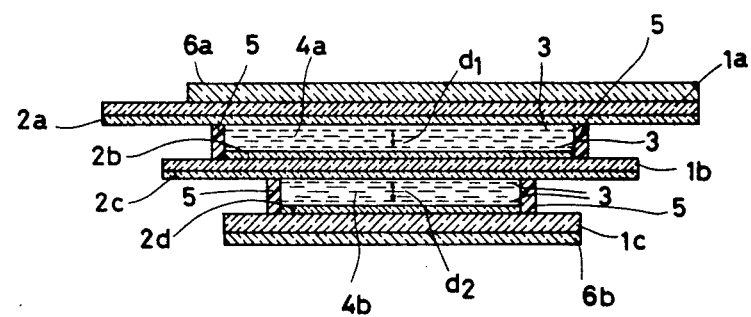

TWO-LAYER LIQUID CRYSTAL DISPLAY PANEL

BACKGROUND OF THE INVENTION

The present invention relates to a liquid crystal display cell and, more particularly, to a liquid crystal display panel providing an improved display contrast.

The thickness of conventional liquid crystal display cells, in particular, twisted nematic liquid crystal display cells, is typically about 10 μm owing to their electro-optic response characteristics. However, it was difficult to uniformly apply a suitable high electric field to such a thin liquid crystal cell. Therefore, polarized light applied was not able to satisfy Mauguin limit of $d \cdot \Delta n >> \lambda$ where $\Delta n$ is the double refractive index of a liquid crystal layer, d is the thickness of the liquid crystal layer, and $\lambda$ is the wavelength of applied light, in the case where the polarized light is applied to the liquid crystal layer along the direction parallel to or perpendicular to the longitudinal axes of liquid crystal molecules in the liquid crystal layer.

Consequently, the polarized light cannot twist to a required degree, say, to a right angle to thereby provide elliptic polarization with rotational polarization. Under the circumstances, when in addition to a polarizer an analyzer is used to analyze light passing through the liquid crystal layer, it appears that transmission light is colored owing to the interference by double refraction even in the case of cross or parallel structure with respect to the polarizer and the analizer.

Disadvantageously, this led to poor display contrast ratio and poor viewability.

SUMMARY OF THE INVENTION

In view of the foregoing, it is an object of the present invention to provide an improved liquid crystal display with a high display contrast.

It is another object of the present invention to provide a novel two-layer liquid crystal display panel formed with three substrates.

It is a further object of the present invention to provide an improved liquid crystal display which does not cause coloration of transmission light owing to interference by double refraction, thereby accomplishing a good display contrast.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a twisted nematic liquid crystal display cell has two layers each containing a liquid crystal material. The value of $\Delta n \cdot d$, where $\Delta n$ is the double refractive index of a liquid crystal layer and d is the thickness of liquid crystal layer, deviates of the two liquid crystal layers differ from each other by about 5% to about 30%, more preferably, about 10% to about 20%. This leads to the advantage that coloration of transmission light owing to interference by double refraction is prevented.

BRIEF DESCRIPTION OF THE DRAWINGS

The present invention will be better understood from the detailed description given hereinbelow and the accompanying drawing which is given by way of illustration only, and thus are not limitative of the present invention and wherein:

The single FIGURE shows a cross-sectional view of a liquid crystal display according to the present invention.

DESCRIPTION OF THE INVENTION

With reference to the single FIGURE, there is shown a twisted nematic liquid crystal display cell according to the present invention comprising three substrates 1a, 1b and 1c, four patterned transparent electrodes 2a, 2b, 2c and 2d, four orientation layers 3, two liquid crystal layers 4a and 4b, spacers 5, and two polarizers 6a and 6b.

Selected materials of the three substrates 1a, 1b, and 1c may be glass. They parallel with one another. On the inner surface of each of the three substrates 1a, 1b and 1c, there is disposed one each of the four patterned transparent electrodes 2a, 2b, 2c and 2d made of $In_2O_3$, $SnO_2$ or the like to provide electric energy to each of the liquid crystal layers 4a and 4b. Each of the four orientation layers 3 is formed on the surface of one of the four patterned electrodes 2a, 2b, 2c and 2d to provide orientation of liquid crystal molecules. Each of the layers 3 may be made of $SiO_2$.

Each of the two liquid crystal layers 4a and 4b comprises nematic liquid crystal mixtures to provide the twisted nematic liquid crystal display cell in which the longitudinal axes of the liquid crystal molecules at each surface of the three substrates 1a, 1b and 1c are at right angles to each other. In each of the two liquid crystal layers 4a and 4b, the directions of the longitudinal axes of the liquid crystal molecules are identical to each other.

Around the periphery of each of the substrates 1a, 1b and 1c, there is provided one of the spacers 5 for sealing each of the liquid crystal layers 4a and 4b. The spacers 5 may comprise epoxy synthetic resin with glass fiber particles. On the display side and the opposite side, one of the polarizers 6a and 6b is provided.

The plane of polarization of the polarizer 6a is selected to be substantially perpendicular to or parallel to that of the analyzer 6b. Further, in the case where the plane of polarization of the polarizer 6a is substantially perpendicular to that of the analyzer 6b, the direction of the longitudinal axes of the liquid crystal molecules adjacent to each of the polarizer 6a and the analyzer 6b is selected to be substantially perpendicular to or parallel to the plane of polarization of each of the polarizer 6a and the analyzer 6b. When the axis of the polarizer 6a is substantially parallel to that of the analyzer 6b, the direction of the longitudinal axes of the liquid crystal molecules adjacent to each of the polarizer 6a and the analyzer 6b is selected to be substantially perpendicular to or parallel to the plane of polarization of each of the polarizer 6a and the analyzer 6b.

This arrangement provides four different possible combinations in connection with the plane of polarization of each of the polarizer 6a and the analyzer 6b, and the direction of the longitudinal axes of the liquid crystal molecules.

The double refractive index of each of the liquid crystal layers 4a and 4b is selected to be $\Delta n_1$ and $\Delta n_2$ which are slightly different from each other. The materials of the layers 4a and 4b are different from each other. The direction of polarization of the liquid crystal molecules in each of the layers 4a and 4b is identical to each other. The thickness of each of the layers 4a and 4b is selected to be $d_1$ and $d_2$ which are substantially equal to each other. Preferably, the values of $d_1$ and $d_2$ are choosen to be about 4 $\mu$m to about 10 $\mu$m.

According to a specific example of the present invention, the values of $d_1$ and $d_2$ are chosen to be about 6 $\mu$m. The materials of the layers 4a and 4b is ROTN 403 and ROTN 570, respectively, both produced by Hoffmann-La Roche Inc. to thereby provide $\Delta n_1 = 0.26$, $\Delta n_2 = 0.22$ with respect to $\lambda = 633$ nm. In connection with the electro-optic characteristics of the twisted nematic field effect mode, both specific liquid crystal mixtures 4a and 4b provide about 1.55 V as a threshold voltage. In addition, they show similar response time characteristics. At room temperature, they show substantially similar electro-optic characteristics. Therefore, no substantial difference in the aspect of the display contrast ratio and the response time appears to be present between a first display using the liquid crystal layer 4a and a second display using the liquid crystal layer 4b, as the alternative display, even in case where the alternative display extends the total display zone.

It is advantageous that the display cell embodying the present invention eliminates coloration of the transmission light owing to interference by the double refraction to thereby provide a good display contrast ratio, as opposed to imaginary type of liquid crystal displays wherein the materials of the layers 4a and 4b are identical and provide the same double refractive index with the same thickness of the layers 4a and 4b.

It is believed that the above described advantage results from the following:

Any kind of light, say, natural light applied to the first liquid crystal layer 4a is adjusted to be linearly polarized light by the polarizer 6a. As the layer 4a is a twisted nematic liquid crystal layer, light passing through the layer 4a is changed to elliptic polarization, not linearly polarized light with rotatory polorized at right angles, where the light is incident to the second liquid crystal layer 4b.

This occurs in the case without the application of any electric energy to the layer 4a, with the application of electric energy below the threshold voltage to the layer 4a, and with satisfaction of a condition of "$d_1 \cdot \Delta n_1 \leq \lambda$", even when the direction of the polarization of the applied light to the layer 4a is substantially parallel to or perpendicular to the plane of the longitudinal axes of the liquid crystal molecules in the layer 4a.

The second liquid crystal layer 4b can function as a kind of optical compensator where the value of "$d_2 \cdot \Delta n_2$" with respect to the second liquid crystal layer 4b deviates from the value of "$d_1 \cdot \Delta n_1$" with respect to the first liquid crystal layer 4a by, preferably, about 5% to about 30%, and, more preferably, about 10% to about 20%. This preferable value is determined by experience.

The effect of compensation by the layer 4b is that the light transmitted by the layer 4b becomes close to linearly polarized light. Under the circumstances, when the analyzer 6b analyzes the light passing through the layer 4b, coloration by interference owing to the double refraction can be eliminated.

By a simplified calculation, the deviation of about 5% to about 30% can be obtained by deviating the values of $\Delta n_1$ and $\Delta n_2$ by about 5–30% from each other when the values of $d_1$ and $d_2$ are identical to each other. Alternatively the values of $d_1$ and $d_2$ may be varied with respect to each other by 5–30% when the values of $\Delta n_1$ and $\Delta n_2$ are identical to each other.

The first type of deviation is more practical than the second type of deviation since $d_1$ and $d_2$ should be kept equal to obtain equivalent response time characteristics. However, variations should not be limited to the first type of deviation because the materials of the layers 4a and 4b can be selected to obtain the above deviation, which may also be obtained by varying any or all of the values of $\Delta n_1$, $\Delta n_2$, $d_1$ and $d_2$, with fulfilling the requirement of the response time characteristics.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A liquid crystal display cell comprising:
   first, second and third substrate means;
   a first pair of patterned electrode means formed on said first and said second substrate means, and a second pair of patterned electrode means formed on said second and said third substrate means;
   said first and said second substrate means forming a first cavity therebetween and said second and said third substrate means forming a second cavity therebetween;
   a first liquid crystal layer disposed in said first cavity and a second liquid crystal layer disposed in said second cavity; and
   a pair of polarizers each adhered to an outer surface of said first substrate means and said third substrate means, respectively;
   each of said polarizers having a plane of polarization substantially perpendicular to or parallel to the plane of polarization of the other of said polarizers;
   the plane of polarization of each of said polarizers being substantially perpendicular to or parallel to the direction of the longitudinal axes of liquid crystal molecules in each of said first liquid crystal layer and said second liquid crystal layer;
   where the value of the product $\Delta n_1 \cdot d_1$ wherein $\Delta n_1$ is the double refractive index of said first liquid crystal layer and $d_1$ is the thickness of said first liquid crystal layer, deviates from the value of the product $\Delta n_2 \cdot d_2$, wherein $\Delta n_2$ is the double refractive index of said second liquid crystal layer and $d_2$ is the thickness of said second liquid crystal layer, by about 10% to about 20% and both $\Delta n_1 \cdot d_1$ and $\Delta n_2 \cdot d_2$ for visible light are less than 2 $\mu$m.

2. The cell of claim 1, wherein the thicknesses of said first liquid crystal layer and said second liquid crystal layer are substantially identical to each other.

3. The cell of claim 1, wherein the electro-optic characteristics of said first liquid crystal layer and said second liquid crystal layer are substantially similar to each other.

* * * * *